United States Patent
Lin et al.

(10) Patent No.: US 10,802,877 B2
(45) Date of Patent: Oct. 13, 2020

(54) TASK MANAGEMENT METHODS AND SYSTEM, AND COMPUTER STORAGE MEDIUM

(71) Applicant: ONEPLUS TECHNOLOGY (SHENZHEN) CO., LTD., Shenzhen (CN)

(72) Inventors: Kengyu Lin, Shenzhen (CN); Wenyen Chang, Shenzhen (CN)

(73) Assignee: ONEPLUS TECHNOLOGY (SHENZHEN) CO., LTD., Shenzhen (CN)

( * ) Notice: Subject to any disclaimer, the term of this patent is extended or adjusted under 35 U.S.C. 154(b) by 206 days.

(21) Appl. No.: 15/773,984

(22) PCT Filed: Aug. 16, 2016

(86) PCT No.: PCT/CN2016/095561
§ 371 (c)(1),
(2) Date: May 4, 2018

(87) PCT Pub. No.: WO2017/080273
PCT Pub. Date: May 18, 2017

(65) Prior Publication Data
US 2018/0321972 A1  Nov. 8, 2018

(30) Foreign Application Priority Data
Nov. 9, 2015 (CN) .......................... 2015 1 0759800

(51) Int. Cl.
*G06F 9/46* (2006.01)
*G06F 9/48* (2006.01)
(Continued)

(52) U.S. Cl.
CPC ............ *G06F 9/4887* (2013.01); *G06F 1/329* (2013.01); *G06F 9/48* (2013.01); *G06F 9/485* (2013.01);
(Continued)

(58) Field of Classification Search
CPC ..................................................... G06F 9/4881
(Continued)

(56) References Cited

U.S. PATENT DOCUMENTS 6,297,821 B1 * 10/2001 Baker .............. G07B 17/00193
705/401
8,245,062 B1 * 8/2012 Nanda ................... G06F 1/3228
713/300
(Continued)

FOREIGN PATENT DOCUMENTS

| CN | 1287282 C | 11/2006 |
| CN | 101452404 A | 6/2009 |

(Continued)

OTHER PUBLICATIONS

Supplementary European Search Report in European application No. 16863451.7, dated Oct. 12, 2018.
(Continued)

*Primary Examiner* — Mehran Kamran
(74) *Attorney, Agent, or Firm* — Syncoda LLC; Feng Ma (57) ABSTRACT

A task management method and system, and a computer storage medium include: monitoring the operation of background tasks; determining the allowed operation time of a specific background task in a unit time, the sum of the operation times allowed for all the specific background tasks within the unit time being less than or equal to a preset time threshold; and the respective specific background tasks are
(Continued)

brought into a waiting state when the specific background tasks are outside of the corresponding operation period within the unit time.

12 Claims, 7 Drawing Sheets (51) Int. Cl.
*G06F 1/329* (2019.01)
*G06F 9/50* (2006.01)

(52) U.S. Cl.
CPC .......... *G06F 9/4881* (2013.01); *G06F 9/5038* (2013.01); *Y02D 10/24* (2018.01); *Y02D 50/20* (2018.01)

(58) Field of Classification Search
USPC ........................................................ 718/103
See application file for complete search history.

(56) References Cited

U.S. PATENT DOCUMENTS

| | | | | | |
|---|---|---|---|---|---|
| 8,869,154 | B1* | 10/2014 | Hillyard | ................ | G06F 9/4881 718/102 |
| 9,201,693 | B2* | 12/2015 | Fuller | ................... | G06F 9/5011 |
| 9,798,629 | B1* | 10/2017 | Shilane | ............... | G06F 11/1464 |
| 2003/0014467 | A1* | 1/2003 | Hanzawa | ................ | G06F 1/3228 718/102 |
| 2004/0015971 | A1* | 1/2004 | Spoltore | ............... | G06F 9/4887 718/102 |
| 2009/0019445 | A1* | 1/2009 | Oswald | ................ | G06F 9/4881 718/104 |
| 2011/0320977 | A1* | 12/2011 | Bahn | ..................... | G06F 3/0481 715/810 |
| 2012/0179793 | A1* | 7/2012 | Jahagirdar | ............ | G06F 9/5027 709/221 |
| 2012/0260118 | A1* | 10/2012 | Jiang | ..................... | G06F 9/4843 713/340 |
| 2014/0015971 | A1* | 1/2014 | DeJuliis | ................. | H04N 7/181 348/148 |
| 2014/0113616 | A1* | 4/2014 | Ljung | ................. | H04L 41/0893 455/419 |
| 2014/0250393 | A1* | 9/2014 | Goodson | ............... | G06F 3/0481 715/765 |
| 2014/0366040 | A1* | 12/2014 | Parker | ..................... | G06F 9/542 719/318 |
| 2015/0347184 | A1* | 12/2015 | Kim | ...................... | G06F 9/4856 718/104 |
| 2016/0004289 | A1* | 1/2016 | Chung | .................... | G06F 1/324 713/322 |
| 2016/0132093 | A1* | 5/2016 | Maiolani | ............... | G06F 9/4893 713/320 |
| 2016/0224380 | A1* | 8/2016 | Wang | ...................... | G06F 9/546 |
| 2018/0329750 | A1* | 11/2018 | Lin | ........................ | G06F 9/4881 |

FOREIGN PATENT DOCUMENTS

| | | |
|---|---|---|
| CN | 103049319 A | 4/2013 |
| CN | 103077083 A | 5/2013 |
| CN | 103077086 A | 5/2013 |
| CN | 103176842 A | 6/2013 |
| CN | 103902364 A | 7/2014 |
| CN | 104035818 A | 9/2014 |
| CN | 104657212 A | 5/2015 |
| CN | 104820616 A | 8/2015 |
| CN | 104834564 A | 8/2015 |
| CN | 105320561 A | 2/2016 |
| CN | 105320570 A | 2/2016 |

OTHER PUBLICATIONS

Chahar Vaishali et al: "Fuzzy based multilevel queue scheduling algorithm", 2013 International Conference on Advances in Computing, Communications and Informatics (ICACCI), IEEE, Aug. 22, 2013 (Aug. 22, 2013), pp. 115-120, XP032510101, DOI: 10.1109/ICACCI.2013.6637156 ISBN: 978-1-4799-2432-5 [retrieved on Oct. 18, 2013] * title; pp. 115-119; figures 1-5 *.
Saboori E et a l: "A new scheduling algorithm for server farms load balancing", Industrial and Information Systems ( IIS), 2010 2nd International Conference on, IEEE, Piscataway, NJ, USA, Jul. 10, 2010 (Jul. 10, 2010), pp. 417-420, XP031749003, ISBN: 978-1-4244-7860-6* section D; p. 418 *.
International Search Report in international application No. PCT/CN2016/095561, dated Nov. 22, 2016.
English Translation of the Written Opinion of the International Search Authority in international application No. PCT/CN2016/095561, dated Nov. 22, 2016.

* cited by examiner

TASK MANAGEMENT METHODS AND SYSTEM, AND COMPUTER STORAGE MEDIUM

TECHNICAL FIELD

The disclosure relates to the technical field of operating systems, and particularly to a task management method and system and a computer storage medium.

BACKGROUND

At present, a lot of computing equipment (for example, smart phones and tablet computers) support a multitask system, that is, the equipment may run multiple application programs at the same time, there may be one or more threads in each application program, and a task is run on each thread. Multiple tasks may usually include foreground tasks and background tasks. The background tasks may compete with the foreground tasks for resources and preempt resources for the foreground tasks, and sometimes may interfere with running of the foreground tasks. The resources may be a Central Processing Unit (CPU), a Graphics Processing Unit (GPU), a memory and the like. For solving this problem, a conventional method is to completely suspend the background tasks. However, some background tasks are required to communicate with a server in real time, for example, information transmission or mail service, and if the background tasks are completely suspended, there may exist the problems of incapability of timely feeding back information, other unexpected behaviors or the like.

SUMMARY

In view of this, an embodiment of the disclosure provides a task management method, which may not only ensure normal running of background tasks but also reduce resource contention between the background tasks and foreground task, so that the resources is saved.

In addition, an embodiment of the disclosure provides a task management system, which may not only ensure normal running of the background tasks but also reduce resource contention between the background tasks and the foreground task, so that the resources is saved.

Moreover, an embodiment of the disclosure provides a computer storage medium, which may not only ensure normal running of the background tasks but also reduce resource contention between the background tasks and the foreground task, so that the resources is saved.

A task management method according to the embodiments of the disclosure includes that:

running of background tasks is monitored;

an allowed running time period of a specific background task within a unit time is determined, a sum of the allowed running time periods of all the specific background tasks within the unit time being less than or equal to a preset time threshold; and each specific background task is put into a waiting state during a time period outside a running time period corresponding to the specific background task within the unit time.

In one embodiment, after the step that the running of the background tasks is monitored, the method may further include that:

a background task group is established, and a resource utilization time limit of the background task group is set to be the preset time threshold; and the specific background task is added into the background task group according to a predetermined rule.

In one embodiment, the method may further include the following steps that:

priorities of a foreground task under execution and the background tasks in the background task group are acquired; and in the case that the priority of the foreground task is the same as that of the background tasks in the background task group, it is determined that the allowed running time period of each background task in the background task group within the unit time is obtained by dividing the time threshold by a sum of a total number of the foreground task and a total number of the background tasks in the background task group.

In one embodiment, after the step that the priorities of the foreground task under execution and the background tasks in the background task group are acquired, the method may further include that:

in the case that the priority of the foreground task is different from that of the background tasks in the background task group, the allowed running time period of each background task in the background task group within the unit time is determined on the basis of the priorities of the foreground task and the background tasks in the background task group according to a predetermined algorithm.

In one embodiment, after the step that each specific background task is put into the waiting state during the time period outside the running time period corresponding to the specific background task within the unit time, the method may further include that:

whether there is a foreground task being executed or not when each specific background task enters the waiting state is decided;

if there is a foreground task being executed, it is determined that the foreground task obtain all resource utilization time; and if there is no foreground task being executed, a sleep state is entered.

A task management system according to the embodiments of the disclosure includes:

a monitoring module, configured to monitor running of background tasks;

a determination module, configured to determine an allowed running time period of a specific background task within unit time, a sum of the allowed running time periods of all the specific background tasks within the unit time being less than or equal to a preset time threshold; and a waiting module, configured to put each specific background task into a waiting state during a time period outside a running time period corresponding to the specific background task within the unit time.

In one embodiment, the system may further include:

an establishment module, configured to establish a background task group, and set a resource utilization time limit of the background task group to be the preset time threshold; and an addition module, configured to add the specific background task into the background task group according to a predetermined rule.

In one embodiment, the system may further include:

a priority acquisition module, configured to acquire priorities of a foreground task under execution and the background tasks in the background task group, wherein the determination module is further configured to, in the case that the priority of the foreground task is the same as that of the background tasks in the background task group, determine that the allowed running time period of each background task in the background task group within the unit time is obtained by dividing the time threshold by a sum of a total number of the foreground task and a total number of the background tasks in the background task group.

In one embodiment, the determination module may further be configured to, in the case that the priority of the foreground task is different from that of the background tasks in the background task group, determine, according to a predetermined algorithm, the allowed running time period of each background task in the background task group within the unit time on the basis of the priorities of the foreground task and the background tasks in the background task group.

In one embodiment, the system may further include:
a decision module, configured to decide whether there is a foreground task being executed or not when each specific background task enters the waiting state,
wherein the determination module is further configured to, in the case that it is decided that there is a foreground task being executed when each specific background task enters the waiting state, determine that the foreground task obtain all resource utilization time; and
a sleep module, configured to, in the case that it is decided that there is no foreground task being executed when each specific background task enters the waiting state, enter a sleep state.

When executing processing, the monitoring module, the determination module, the waiting module, the establishment module, the addition module, the priority acquisition module and the decision module may be implemented by a CPU, a Digital Signal Processor (DSP) or a Field-Programmable Gate Array (FPGA).

An embodiment of the disclosure further provides a computer storage medium, in which computer-executable instructions are stored, the computer-executable instructions being configured to execute a task management method in any of the abovementioned embodiments.

According to the task management method and system and computer storage medium in the embodiments of the disclosure, within the unit time, each specific background task is run only during the running time period corresponding to the specific background task, each specific background task is put into a waiting state during a time period outside the running time period corresponding to the specific background task, and the sum of the allowed running time periods of all the specific background tasks does not exceed the preset time threshold, so that not only may normal running of the background tasks be ensured, but also the background tasks may not unrestrictedly preempt resources with the foreground task, higher resource utilization efficiency is achieved for the foreground task, and resources are saved.

In addition, when all the background tasks enter the waiting state and there is no foreground task being executed, the sleep state is automatically entered, so that power consumption of equipment is reduced.

DETAILED DESCRIPTION

For making the purpose, technical solutions and advantages of the disclosure clearer, the disclosure will further be described below in combination with the drawings and embodiments in detail. It should be understood that the specific embodiments described herein are intended not to limit the disclosure but only to explain the disclosure.

Figure 1:
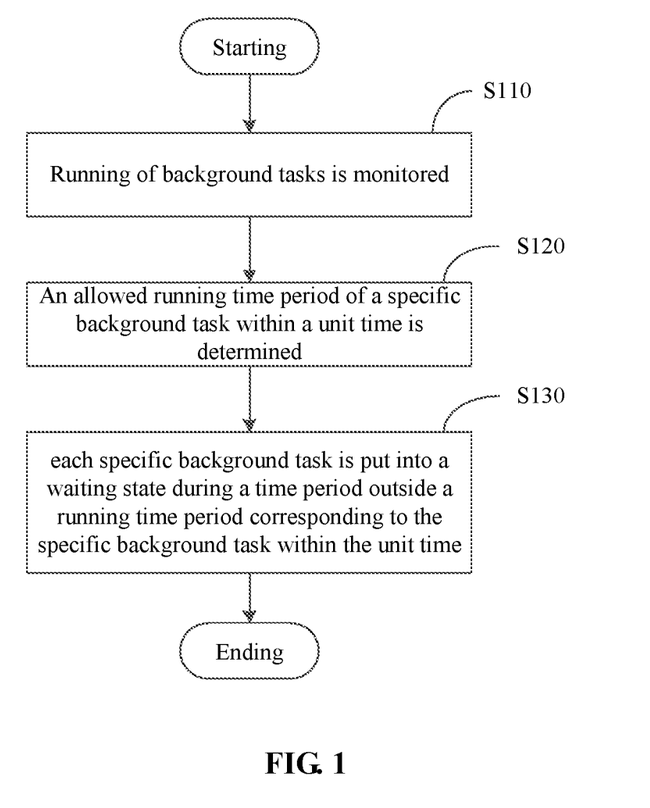
FIG. 1 is a flowchart of a task management method according to an embodiment.

As shown in FIG. 1, a task management method includes the following steps.

In S110, running of background tasks is monitored.

Specifically, information about a number, priorities, User Identifiers (UIDs) and the like of the background tasks may be acquired by monitoring the running of the background tasks.

In S120, an allowed running time period of a specific background task within a unit time is determined.

Specifically, time is divided into multiple continuous pieces of unit time for monitoring, and the specific background task has a resource utilization right only in partial period within the unit time, that is, each specific background task is run only during a partial period corresponding to the background task, and a duration of the partial period is equal to the determined allowed running time period. A sum of the allowed running time periods of all the specific background tasks within the unit time is less than or equal to a preset time threshold, and the time threshold is a maximum value of the sum of the allowed running time periods of all the specific background tasks within the time unit. It may be set according to a practical requirement that the specific background task refers to any background task in all background tasks. In another embodiment, it may also be set according to a practical requirement that the specific background task refers to a background task that meets a predetermined rule in all background tasks. A foreground task refers to a task that requires a user to participate in interaction, and a background task refers to a task that does not require a user to participate in interaction. For example, in a text edition software, reception of a character input by a user is a foreground task, and automatically saving at regular intervals is a background task. The time threshold is less than the unit time. For example, the unit time may be 2 T, and the time threshold may be T, 0.5 T, 0.75 T and the like. T may be a numerical value of relatively short time such as 10 seconds (s), 15 s and 20 s, so that execution of the background tasks may be ensured better, and work may be prevented from being delayed by excessively long waiting time.

In an embodiment, after the step that running of the background tasks is monitored, the method further includes the following steps.

In (1), a background task group is established, and a resource utilization time limit of the background task group is set to be the preset time threshold.

Specifically, the background task group is established to manage the background tasks, and only the background tasks in the background task group are limited by the resource utilization time limit, that is, a sum of the allowed running time periods of the background tasks in the background task group within the unit time does not exceed the time threshold. The allowed running time period of each background task in the background task group within the unit time is determined at least according to the resource utilization time limit and priorities of the background tasks in the background task group. For each background task in the background task group, the background task is executed only during the partial period corresponding to the background task within the unit time, and the background task is put into a waiting state during the time period outside the partial period within the unit time. The unit time and the time threshold may be set according to a requirement.

In (2), specific background tasks are added into the background task group according to a predetermined rule.

Specifically, the background tasks unassociated with the foreground task under execution may be added into the background task group. For example, in the text edition software, automatically saving at regular intervals is a background task, and when the foreground task of receiving the character input by the user is executed, the background task is not added into the background task group. However, if there also exists a background task of mail service at this moment which is unassociated with the foreground task under execution, the background task is added into the background task group, so that execution of the foreground task may be ensured better, and higher resource utilization efficiency is achieved for a foreground application. It can be understood that another rule may also be set according to a requirement, and then the specific background tasks that meet the rule are added into the background task group.

In S130, each specific background task is put into a waiting state during a time period outside a running time period corresponding to the specific background task within the unit time.

Figure 2:
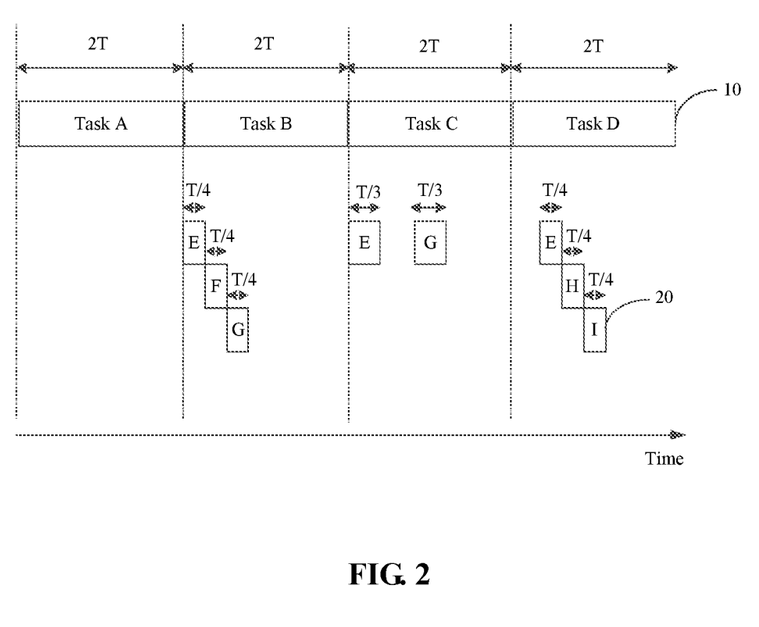
FIG. 2 is a time diagram of task execution according to an embodiment.

Specifically, within the unit time, each specific background task is executed only during the running time period corresponding to the background task, and a duration of the running time period is equal to the allowed running time period of the background task within the unit time. FIG. 2 is a schematic diagram of task execution according to an embodiment. As shown in FIG. 2, it is assumed that the unit time is 2 T and the time threshold is T, and the running of a background task 20 and a foreground task 10 is monitored. In the second 2 T unit time, the allowed running time period of each of the background tasks E, F and G is T/4, the tasks are executed during respective running time period corresponding to the background tasks E, F and G, respectively, and the background tasks E, F and G are in the waiting state respectively during the time period outside the respective running time period. The waiting state refers to that the background tasks may not utilize any resource. A sum of the allowed running time periods of the background tasks E, F and G is less than the time threshold T. When the background tasks E, F and G all enter the waiting state, a foreground task B may utilize all resources without facing competition with the background tasks E, F and G for the resources. In the third 2 T time unit, the allowed running time period of the background task E is T/3, and the background task E enters the waiting state during the time period outside the running time period corresponding to the background task E. After a period of time, the running time period (a duration of the time period is T/3) of the background task G is entered. It is only necessary to ensure that the sum of the allowed running time periods of all the specific background tasks within the unit time is less than or equal to the time threshold, and the time period during which each specific background task is run within the unit time is determined by an algorithm of a task scheduler of an operating system. In another embodiment, within the unit time, the specific background tasks may enter the waiting state at first, and then are executed. For example, within the 2 T unit time, all the specific background tasks enter the waiting state at first, and after time T, each specific background task is executed according to the allowed running time period of each specific background task. It can be understood that such a method is essentially consistent with the task management method in FIG. 2.

According to the task management method, each specific background task is run only during the running time period corresponding to the background task per unit time, each specific background task is put into the waiting state during the time period outside the running time period corresponding to the background task, and the sum of the allowed running time periods of all the specific background tasks does not exceed the preset time threshold, so that not only normal running of the background tasks may be ensured, but also the background tasks may not unrestrictedly preempt resources with the foreground tasks, higher resource utilization efficiency is achieved for the foreground tasks, and resources are saved.

Figure 3:
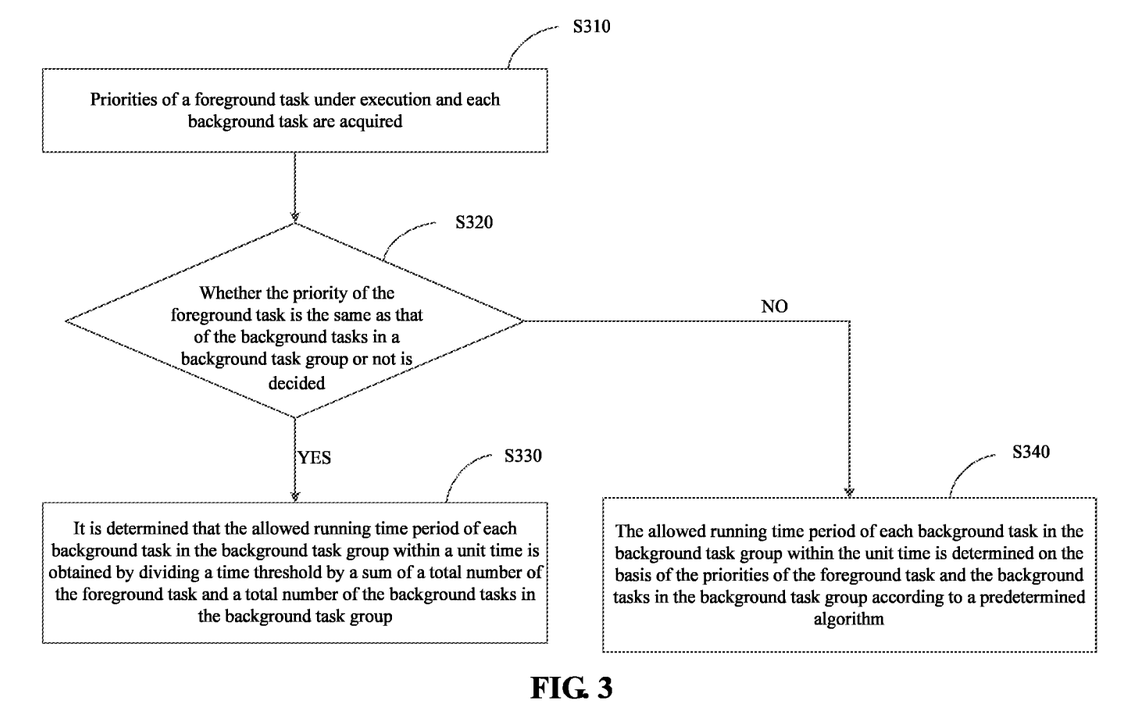
FIG. 3 is a flowchart of allocation of resource utilization time for foreground tasks and background tasks according to an embodiment.

As shown in FIG. 3, in an embodiment, the task management method further includes the following steps.

In S310, priorities of the foreground task under execution and the background tasks in the background task group are acquired.

Specifically, the priorities of the foreground task under execution and each background task in the background task group are acquired, and resource utilization time of each task is determined according to the priorities. A task with a high priority may usually obtain more allowed running time period than a task with a low priority.

In S320, whether the priority of the foreground task is the same as that of the background tasks in the background task group is determined, if YES, S330 is executed, and if NO, S340 is executed.

Specifically, the time threshold is the resource utilization limit of the background tasks in the background task group within the unit time, that is, within the unit time, the sum of the allowed running time periods of the background tasks in the background task group is required to be less than or equal to the time threshold. Within the unit time, the allowed running time period of each task may be determined at least according to the time threshold and the priority of the task; if the priority of the foreground task is the same as that of the background tasks in the background task group, the allowed running time period of each background task in the background task group is obtained by dividing the time threshold by a sum of a total number of the foreground task and a total number of the background tasks in the background task group; and if the priority of the foreground task is different from that of the background tasks, the resource utilization time of the foreground task and each background task in the background task group is determined according to the priorities and a predetermined algorithm.

In S330, it is determined that the allowed running time period of each background task in the background task group within the unit time is obtained by dividing the time threshold by a sum of a total number of the foreground task and a total number of the background tasks in the background task group.

Specifically, for example, in FIG. 2, in the second 2 T unit time, the time threshold is T, there are totally one foreground task B and three background tasks E, F and G, and then resource utilization time of T/4 is allocated to each task averagely. In addition, a time T outside the time threshold within the unit time may be allocated to the foreground task B, and then resource utilization time of totally T+T/4 may be allocated to the foreground task B within the unit time. If there is no foreground task B is executed at present, resource utilization time of T/3 may be allocated to each of the three background tasks E, F and G averagely. In other embodiments, when the priority of the foreground task is the same as that of the background tasks in the background task group, the time threshold may be halved for the foreground task and the background tasks in the background task group, and the allowed running time period of each background task in the background task group is obtained by dividing a half of the time threshold by the number of the background tasks in the background task group. For example, in FIG. 2, within the unit time, resource utilization time of T/2 is shared by the three background tasks E, F and G, resource utilization time of T/6 may be allocated to each background task, and resource utilization time of T+T/2 is allocated to the foreground task B. An allocation manner is related to the algorithm of the task scheduler in the operating system.

In S340, the allowed running time period of each background task in the background task group within the unit time is determined on the basis of the priorities of the foreground task and the background tasks in the background task group according to a predetermined algorithm.

Specifically, if the priority of the foreground task is different from that of the background tasks in the background task group, the tasks are sorted according to a sequence of the priorities, the task with higher priority is arranged before the task with lower priority, and the resource utilization time of the foreground task and each background task in the background task group may be determined according to the priority of the task and according to the predetermined algorithm. For example, in the 2 T unit time, the time threshold is T, 0.5 T may be allocated to the task with a highest priority, 0.3 T may be allocated to the task with a second highest priority, 0.2 T may be allocated to the task with a third highest priority, and so on. The background tasks in the background task group immediately enter the waiting state respectively during the time period outside the respective running time period corresponding to the background task. In other embodiments, the resources may also be allocated and scheduled according to a sequence of requests of the tasks.

According to the task management method, within the unit time, each background task in the background task group is run only during the running time period corresponding to the background task, and the resource utilization time of the tasks is determined according to the priorities of the tasks, so that resource scheduling may be implemented better to finish work. The background tasks in the background task group enter the waiting state respectively during the time period outside the respective running time period corresponding to the background task, and the sum of the allowed running time periods of the background tasks in the background task group does not exceed the preset time threshold, so that not only normal running of the background tasks may be ensured, but also the background tasks may not unrestrictedly preempt the resources with the foreground tasks, higher resource utilization efficiency is achieved for the foreground tasks, and the resources are saved.

In an embodiment, after the step that each specific background task is put into a waiting state during a time period outside a running time period corresponding to the specific background task within the unit time, the method further includes that: whether a foreground task is being executed or not is decided when each specific background task enters the waiting state; if YES, it is determined that the foreground task obtains all resource utilization time; and if NO, a sleep state is entered.

Figure 4:
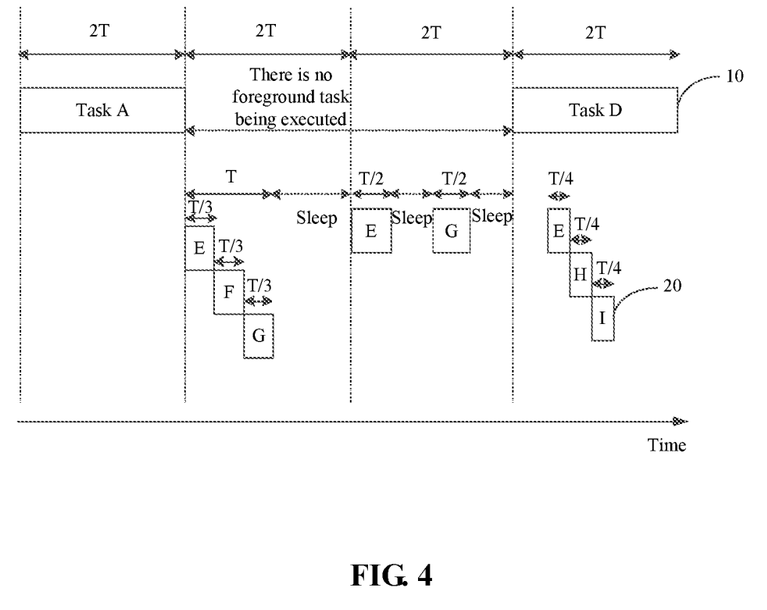
FIG. 4 is a time diagram of task execution according to another embodiment.

Specifically, within the unit time, when the background tasks in the background task group all enter the waiting state, if there is a foreground task being executed, it is determined that the foreground task under execution obtain all the resource utilization time, and if there is no foreground task being executed, the sleep state may be entered, wherein entering the sleep state refers to that a computing equipment executing the task management method enters the sleep state to achieve a purpose of saving power. As shown in FIG. 2, in the second 2 T unit time, after the background task G is run for the time T/4, it enters the waiting state, and the background tasks E and F have previously entered the waiting state. After the background task G enters the waiting state, only the foreground task B is being executed, and the foreground task B will obtain all the resource utilization time, so that higher resource utilization efficiency may be achieved for the foreground application. In the third 2 T unit time, after the background task E is run for the time T/3 and before the running time period of the background task G is started, there is also only a foreground task C being executed in this period of time, and the foreground task C obtains all the resource utilization time. As shown in FIG. 4, there is no foreground task being executed in the second and third 2 T unit time, and when all the background tasks enter the waiting time, the sleep state is automatically entered.

According to the task management method, when all the specific background tasks enter the waiting state, the sleep state is automatically entered if there is no foreground task under execution, so that power consumption of the equipment is reduced.

Figure 5:
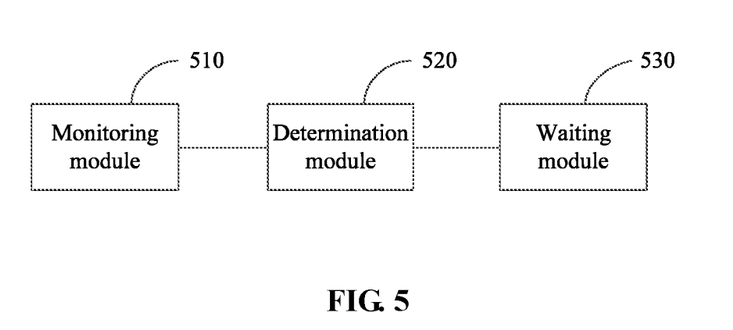
FIG. 5 is a schematic diagram showing a structure of a task management system according to an embodiment.

As shown in FIG. 5, a task management system includes a monitoring module 510, a determination module 520 and a waiting module 530.

The monitoring module 510 is configured to monitor running of background tasks.

Specifically, information about a number, priorities, UIDs and the like of the background tasks may be acquired by monitoring the running of the background tasks.

The determination module 520 is configured to determine an allowed running time period of a specific background task within a unit time.

Specifically, time is divided into multiple continuous pieces of unit time for monitoring, and each specific background task has a resource utilization right only in partial period within the time unit, that is, each specific background task is run only during the partial period corresponding to the background task, and a duration of the partial period is equal to the determined allowed running time period. A sum of the allowed running time periods of all the specific background tasks within the unit time is less than or equal to a preset time threshold, and the time threshold is a maximum value of the sum of the allowed running time periods of all the specific background tasks within the time unit. It may be set according to a practical requirement that the specific background task refers to any background task in all background tasks. In other embodiments, it may also be set according to a practical requirement that the specific background task refers to a background task that meets a predetermined rule in all background tasks. A foreground task refers to a task that requires a user to participate in interaction, and a background task refers to a task that does not require a user to participate in interaction. For example, in a text edition software, reception of a character input by a user is a foreground task, and automatically saving at regular intervals is a background task. The time threshold is smaller than the unit time. For example, the unit time may be 2 T, and the time threshold may be T, 0.5 T, 0.75 T and the like. T may be a numerical value of relatively short time such as 10 seconds (s), 15s and 20s, so that execution of the background tasks may be ensured better, and work may be prevented from being delayed by excessively long waiting time.

The waiting module 530 is configured to put each specific background task into a waiting state during a time period outside a running time period corresponding to the specific background task within the unit time.

Specifically, within the unit time, each specific background task is executed only during the running time period corresponding to the background task, and a duration of the running time period is equal to the allowed running time period of the background task within the unit time. FIG. 2 is a schematic diagram of task execution according to an embodiment. As shown in FIG. 2, it is assumed that the unit time is 2 T and the time threshold is T, and the running of a background task 20 and a foreground task 10 is monitored. In the second 2 T unit time, the allowed running time period of each of the background tasks E, F and G is T/4, the tasks are executed during respective running time period corresponding to the background tasks E, F and G, respectively, and the background tasks E, F and G are in the waiting state respectively during the time period outside the respective running time period. The waiting state refers to that the background tasks may not utilize any resource. A sum of the allowed running time periods of the background tasks E, F and G is less than the time threshold T. When the background tasks E, F and G all enter the waiting state, a foreground task B may utilize all resources without facing competition with the background tasks E, F and G for the resources. In the third 2 T unit time, the allowed running time period of the background task E is T/3, and the background task E enters the waiting state during the time period outside its running time period. After a period of time, the running time period (a duration of the time period is T/3) of the background task G is entered. It is only necessary to ensure that the sum of the allowed running time periods of all the specific background tasks within the unit time is less than or equal to the time threshold, and the time period during which each specific background task is run within the unit time is determined by an algorithm of a task scheduler of an operating system. In other embodiments, within the unit time, the specific background tasks may enter the waiting state at first, and then are executed. For example, within the 2 T unit time, all the specific background tasks enter the waiting state at first, and after time T, each specific background task is executed according to the allowed running time period of each specific background task. It can be understood that such a method is essentially consistent with the task management method in FIG. 2.

According to the task management system, each specific background task is run only during the running time period corresponding to the background task per unit time, each specific background task is put into the waiting state during the time period outside the running time period corresponding to the background task, and the sum of the allowed running time periods of all the specific background tasks does not exceed the preset time threshold, so that not only normal running of the background tasks may be ensured, but also the background tasks may not unrestrictedly preempt resources with the foreground tasks, higher resource utilization efficiency is achieved for the foreground tasks, and resources are saved.

Figure 6:
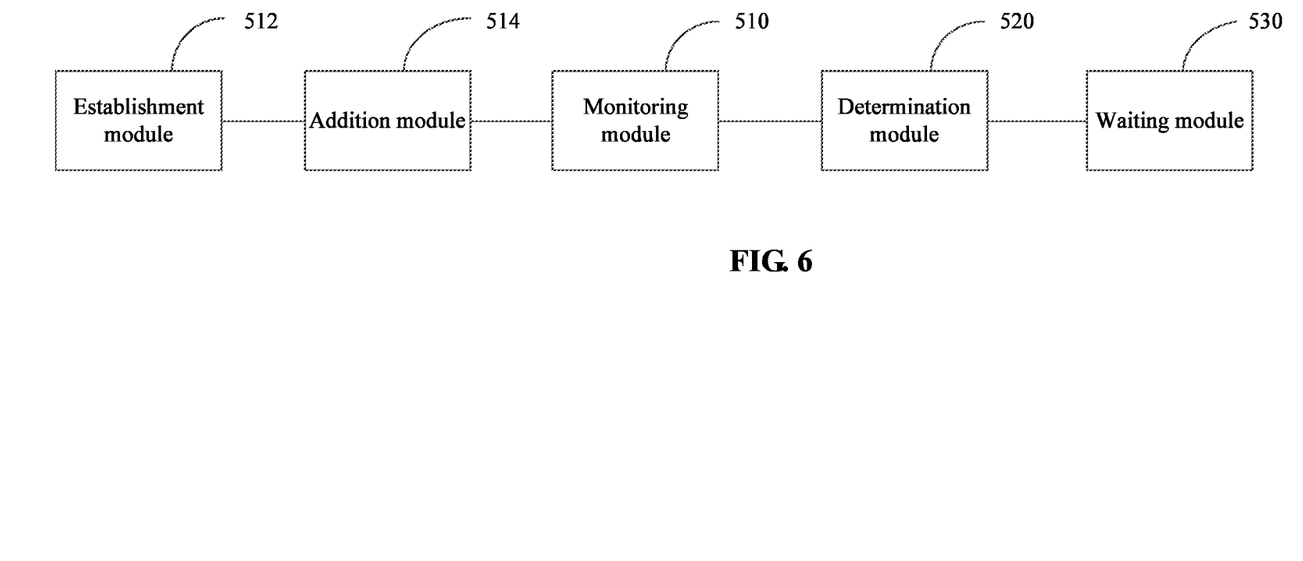
FIG. 6 is a schematic diagram showing a structure of a task management system according to another embodiment.

As shown in FIG. 6, in an embodiment, the task management system further includes an establishment module 512 and an addition module 514, besides the monitoring module 510, the determination module 520 and the waiting module 530.

The establishment module 512 is configured to establish a background task group, and set a resource utilization time limit of the background task group to be the preset time threshold.

Specifically, the background task group is established to manage the background tasks, and only the background tasks in the background task group are limited by the resource utilization time limit, that is, a sum of the allowed running time periods of the background tasks in the background task group within the unit time does not exceed the time threshold. The allowed running time period of each background task in the background task group within the unit time is determined at least according to the resource utilization time limit and priorities of the background tasks in the background task group. For each background task in the background task group, the background task is executed only during the partial period corresponding to the background task within the unit time, and the background task is put into the waiting state during the time period outside the partial period within the unit time. The unit time and the time threshold may be set according to a requirement.

The addition module 514 is configured to add a specific background task into the background task group according to a predetermined rule.

Specifically, the background tasks unassociated with the foreground task under execution may be added into the background task group. For example, in the text edition software, automatically saving at regular intervals is a background task, and when the foreground task of receiving the character input by the user is being executed, the background task is not added into the background task group. However, if there also exists a background task of mail service at this moment which is unassociated with the foreground task under execution, the background task of mail service is added into the background task group, so that execution of the foreground task may be ensured better, and higher resource utilization efficiency is achieved for a foreground application. It can be understood that another rule may also be set according to a requirement, and then the specific background tasks that meet the rule are added into the background task group.

According to the task management system, each background task in the background task group is run only during the running time period corresponding to the background task per unit time, each background task in the background task group is put into the waiting state during the time period outside the running time period corresponding to the background task, and the sum of the allowed running time periods of all the background tasks in the background task group does not exceed the preset time threshold, so that not only normal running of the background tasks may be ensured, but also the background tasks may not unrestrictedly preempt the resources with the foreground tasks, higher resource utilization efficiency is achieved for the foreground tasks, and the resources are saved.

Figure 7:
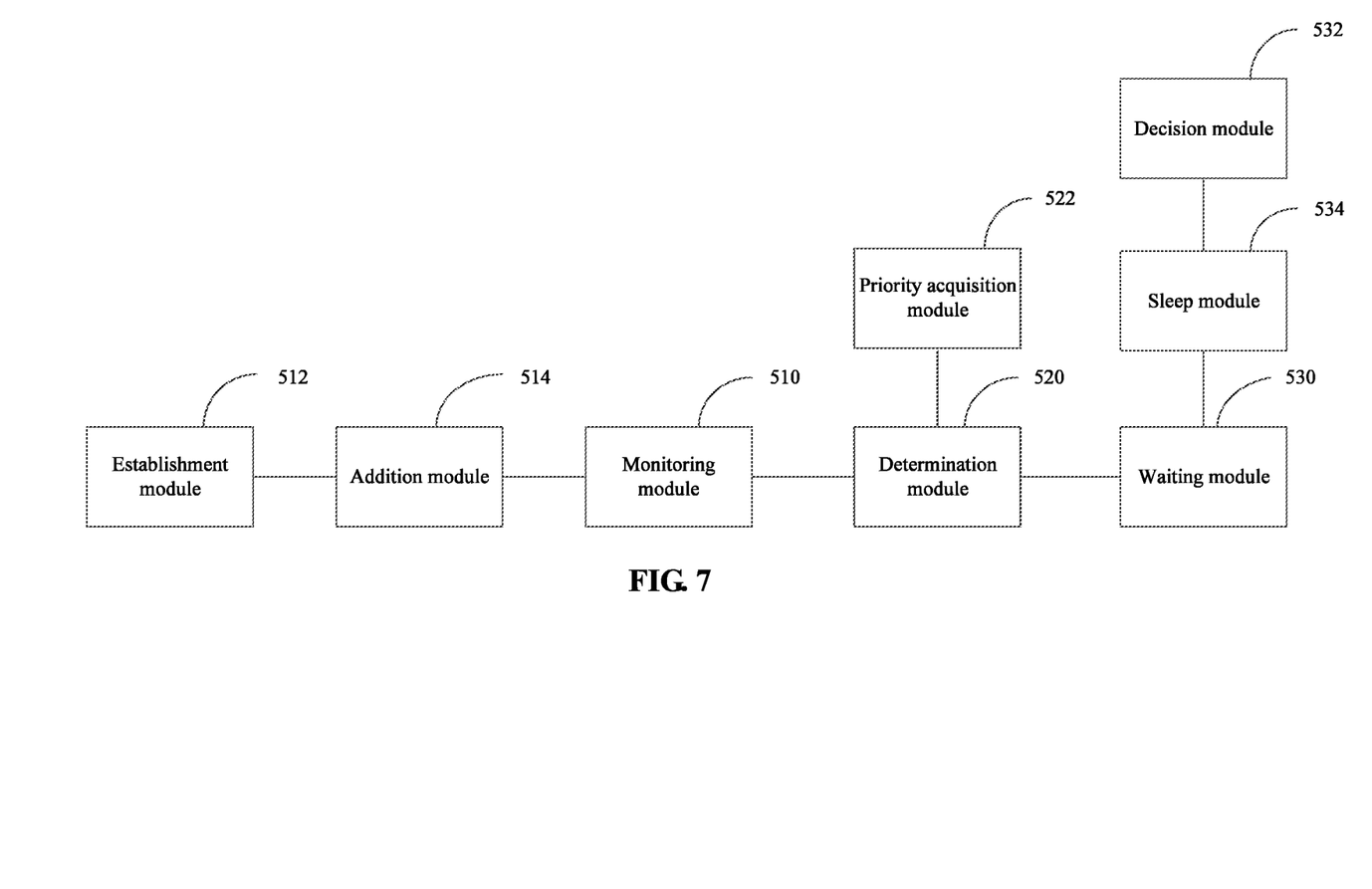
FIG. 7 is a schematic diagram showing a structure of a task management system according to another embodiment.

As shown in FIG. 7, the task management system further includes a priority acquisition module 522, a decision module 532 and a sleep module 534, besides the establishment module 512, the addition module 514, the monitoring module 510, the determination module 520 and the waiting module 530.

The priority acquisition module 522 is configured to acquire priorities of the foreground task under execution and the background tasks in the background task group.

Specifically, the priorities of the foreground task under execution and each background task in the background task group are acquired, and resource utilization time of each task is determined according to the priorities. A task with a high priority may usually obtain more allowed running time period than a task with a low priority. The time threshold is the resource utilization limit of the background tasks in the background task group within the unit time, that is, within the unit time, the sum of the allowed running time periods of the background tasks in the background task group is required to be less than or equal to the time threshold. Within the unit time, the allowed running time period of each task may be determined at least according to the time threshold and the priority of the task. If the priority of the foreground task is the same as that of the background tasks in the background task group, the allowed running time period of each background task in the background task group is obtained by dividing the time threshold by a sum of a total number of the foreground task and a total number of the background tasks in the background task group; and if the priority of the foreground task is different from that of the background tasks, the resource utilization time of the foreground task and each background task in the background task group is determined according to the priorities and a predetermined algorithm.

The determination module 520 is further configured to, in the case that the priority of the foreground task is the same as that of the background tasks in the background task group, determine that the allowed running time period of each background task in the background task group within the unit time is obtained by dividing the time threshold by a sum of a total number of the foreground task and a total number of the background tasks in the background task group.

Specifically, for example, in FIG. 2, in the second 2 T unit time, the time threshold is T, there are totally one foreground task B and three background tasks E, F and G, and then resource utilization time of T/4 is allocated to each task averagely. In addition, time T outside the time threshold within the unit time may also be allocated to the foreground task B, and then resource utilization time of totally T+T/4 may be allocated to the foreground task B within the unit time. If there is no foreground task B is executed at present, resource utilization time of T/3 may be allocated to each of the three background tasks E, F and G averagely. In other embodiments, when the priority of the foreground task is the same as that of the background tasks in the background task group, the time threshold may be halved for the foreground task and the background tasks in the background task group, and the allowed running time period of each background task in the background task group is obtained by dividing a half of the time threshold by the number of the background tasks in the background task group. For example, in FIG. 2, within the unit time, resource utilization time of totally T/2 may be shared by the three background tasks E, F and G, resource utilization time of T/6 may be allocated to each background task, and resource utilization time of T+T/2 is allocated to the foreground task B. An allocation manner is related to the algorithm of the task scheduler in the operating system.

The determination module 520 is further configured to, in the case that the priority of the foreground task is different from that of the background tasks in the background task group, determine, according to a predetermined algorithm, the allowed running time period of each background task in the background task group within the unit time on the basis of the priorities of the foreground task and the background tasks in the background task group.

Specifically, if the priority of the foreground task is different from that of the background tasks in the background task group, the tasks are sorted according to a sequence of the priorities, the task with higher priority is arranged before the task with lower priority, and the resource utilization time of the foreground task and each background task in the background task group may be determined according to the priority of the task and according to the predetermined algorithm. For example, in the 2 T unit time, the time threshold is T, 0.5 T may be allocated to the task with a highest priority, 0.3 T may be allocated to the task with a second highest priority, 0.2 T may be allocated to the task with a third highest priority, and so on. The background tasks in the background task group immediately enter the waiting state respectively during the time period outside the respective running time period. In other embodiments, the resources may also be allocated and scheduled according to a sequence of requests of the tasks.

The decision module 532 is configured to decide whether there is a foreground tasks being executed or not when each specific background task enters the waiting state.

The determination module 520 is further configured to, in the case that it is decided that there is a foreground task being executed when each specific background task enters the waiting state, determine that the foreground task obtains all resource utilization time.

The sleep module 534 is configured to, in the case that it is decided that there is no foreground task being executed when each specific background task enters the waiting state, enter a sleep state.

Specifically, within the unit time, when the background tasks in the background task group all enter the waiting state, if there is a foreground task being executed, it is determined that the foreground task under execution obtains all the resource utilization time, and if there is no foreground task being executed, the sleep state may be entered, wherein entering the sleep state refers to that a computing equipment executing the task management method enters the sleep state to achieve a purpose of saving power. As shown in FIG. 2, in the second 2 T unit time, after the background task G is run for the time T/4, it enters the waiting state, and the background tasks E and F have previously entered the waiting state. After the background task G enters the waiting state, only the foreground task B is being executed, and the foreground task B obtains all the resource utilization time, so that higher resource utilization efficiency may be achieved for a foreground application. In the third 2 T unit time, after the background task E is run for the time T/3 and before the running time period of the background task G is started, there is also only a foreground task C being executed in this period of time, and the foreground task C obtains all the resource utilization time. As shown in FIG. 4, there is no foreground task under execution in the second and third 2 T unit time, and when all the background tasks enter the waiting time, the sleep state is automatically entered.

According to the task management system, within the unit time, each background task in the background task group is run only during the running time period corresponding to the background task, and the resource utilization time of the tasks is determined according to the priorities of the tasks, so that resource scheduling may be implemented better to finish the work. The background tasks in the background task group enter the waiting state respectively during the time period outside the respective running time period, and the sum of the allowed running time periods of the background tasks in the background task group does not exceed the preset time threshold, so that not only normal running of the background tasks may be ensured, but also the background tasks may not unrestrictedly preempt the resources with the foreground task, higher resource utilization efficiency is achieved for the foreground task, and the resources are saved. In addition, when all the specific background tasks enter the waiting state, if there is no foreground task being executed, the sleep state is automatically entered, so that power consumption of the equipment is reduced.

An embodiment of the disclosure further provide a computer storage medium, in which computer-executable instructions are stored, the computer-executable instructions being configured to execute a task management method in any of the abovementioned embodiments.

Each technical characteristic of the abovementioned embodiments may be freely combined. For brief description, not all possible combinations of each technical characteristic in the abovementioned embodiments are described. However, all conflict-free combinations of these technical characteristics shall be considered to fall within the scope recorded by the specification.

The above embodiments only express some implementation modes of the disclosure, which are specifically described in detail, which, however, cannot be interpreted as a limitation of the scope of the disclosure. It is important to point out that those skilled in the art may further make a plurality of transformations and improvements without departing from the concept of the disclosure, and these all fall within the scope of protection of the disclosure. Therefore, the scope of protection of the disclosure shall be subject to the appended claims.

INDUSTRIAL APPLICABILITY

According to the task management solution in the embodiments of the disclosure, each specific background task is run only during the running time period corresponding to the background task per unit time, each specific background task is put into the waiting state during the time period outside the running time period corresponding to the background task, and the sum of the allowed running time periods of all the specific background tasks does not exceed the preset time threshold, so that not only may normal running of the background tasks be ensured, but also the background tasks may not unrestrictedly preempt resources with the foreground task, higher resource utilization efficiency is achieved for the foreground task, and resources are saved.

The invention claimed is:

1. A task management method, comprising:
   monitoring running of background tasks;
   determining an allowed running time period of a specific background task within a unit time, a sum of the allowed running time periods of all the specific background tasks within the unit time being less than or equal to a preset time threshold;
   putting each specific background task into a waiting state during a time period outside a running time period corresponding to the specific background task within the unit time;
   deciding whether there is a foreground task being executed when each specific background task enters the waiting state;
   in a case that there is a foreground task being executed, determining that the foreground task obtains all resource utilization time; and
   in a case that there is no foreground task being executed, entering a sleep state.

2. The task management method according to claim 1, further comprising:
   after the step of monitoring the running of the background tasks,
   establishing a background task group, and setting a resource utilization time limit of the background task group to be the preset time threshold; and
   adding the specific background task into the background task group according to a predetermined rule.

3. The task management method according to claim 2, further comprising:
   acquiring priorities of a foreground task under execution and the background tasks in the background task group; and
   in a case that the priority of the foreground task is the same as that of the background tasks in the background task group, determining that the allowed running time period of each background task in the background task group within the unit time is obtained by dividing the time threshold by a sum of a total number of the foreground task and a total number of the background tasks in the background task group.

4. The task management method according to claim 3, further comprising:
   after acquiring the priorities of the foreground task under execution and the background tasks in the background task group,
   in a case that the priority of the foreground task is different from that of the background tasks in the background task group, determining, according to a predetermined algorithm, the allowed running time period of each background task in the background task group within the unit time on the basis of the priorities of the foreground task and the background tasks in the background task group.

5. A task management system, comprising a processor and a memory for storing a set of instructions executable by the processor, wherein when the instructions are executed by the processor, the processor is configured to:
   monitor running of background tasks;
   determine an allowed running time period of a specific background task within a unit time, a sum of the allowed running time periods of all the specific background tasks within the unit time being less than or equal to a preset time threshold;
   put each specific background task into a waiting state during a time period outside a running time period corresponding to the specific background task within the unit time;
   decide whether there is a foreground task being executed when each specific background task enters the waiting state,
   in a case that it is decided that there is a foreground task being executed when each specific background task enters the waiting state, determine that the foreground task obtains all resource utilization time; and in a case that it is decided that there is no foreground task being executed when each specific background task enters the waiting state, enter a sleep state.

6. The task management system according to claim 5, wherein the processor is further configured to:

establish a background task group, and set a resource utilization time limit of the background task group to be the preset time threshold; and add the specific background task into the background task group according to a predetermined rule.

7. The task management system according to claim 6, wherein the processor is further configured to:

acquire priorities of a foreground task under execution and the background tasks in the background task group, in a case that the priority of the foreground task is the same as that of the background tasks in the background task group, determine that the allowed running time period of each background task in the background task group within the unit time is obtained by dividing the time threshold by a sum of a total number of the foreground task and a total number of the background tasks in the background task group.

8. The task management system according to claim 7, wherein the processor is further configured to, in the a that the priority of the foreground task is different from that of the background tasks in the background task group, determine, according to a predetermined algorithm, the allowed running time period of each background task in the background task group within the unit time on the basis of the priorities of the foreground task and the background tasks in the background task group.

9. A non-transitory computer storage medium, in which computer-executable instructions are stored, which, when executed by a processor, cause the processor to execute a task management method, wherein the method comprises:

monitoring running of background tasks;

determining an allowed running time period of a specific background task within a unit time, a sum of the allowed running time periods of all the specific background tasks within the unit time being less than or equal to a preset time threshold;

putting each specific background task into a waiting state during a time period outside a running time period corresponding to the specific background task within the unit time;

deciding whether there is a foreground task being executed when each specific background task enters the waiting state;

in a case that there is a foreground task being executed, determining that the foreground task obtains all resource utilization time; and in a case that there is no foreground task being executed, entering a sleep state.

10. The non-transitory computer storage medium according to claim 9, wherein the method further comprises:

after the step of monitoring the running of the background tasks, establishing a background task group, and setting a resource utilization time limit of the background task group to be the preset time threshold; and adding the specific background task into the background task group according to a predetermined rule.

11. The non-transitory computer storage medium according to claim 10, wherein the method further comprises:

acquiring priorities of a foreground task under execution and the background tasks in the background task group; and in a case that the priority of the foreground task is the same as that of the background tasks in the background task group, determining that the allowed running time period of each background task in the background task group within the unit time is obtained by dividing the time threshold by a sum of a total number of the foreground task and a total number of the background tasks in the background task group.

12. The non-transitory computer storage medium according to claim 11, wherein the method further comprises:

after acquiring the priorities of the foreground task under execution and the background tasks in the background task group, in a case that the priority of the foreground task is different from that of the background tasks in the background task group, determining, according to a predetermined algorithm, the allowed running time period of each background task in the background task group within the unit time on the basis of the priorities of the foreground task and the background tasks in the background task group.

* * * * *